(12) United States Patent
Yang et al.

(10) Patent No.: US 11,661,361 B2
(45) Date of Patent: May 30, 2023

(54) ENHANCED COAGULATION METHOD FOR REMOVING MICROPLASTICS IN WATER

(71) Applicant: NANJING UNIVERSITY, Nanjing (CN)

(72) Inventors: Hu Yang, Nanjing (CN); Yunong Tang, Nanjing (CN); Pan Hu, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 0 days.

(21) Appl. No.: 17/739,153

(22) Filed: May 8, 2022

(65) Prior Publication Data

US 2022/0363575 A1    Nov. 17, 2022

Related U.S. Application Data

(63) Continuation of application No. PCT/CN2021/108548, filed on Jul. 27, 2021.

(30) Foreign Application Priority Data

May 14, 2021 (CN) .......................... 2021105271809

(51) Int. Cl.
  *C02F 1/52* (2023.01)
  *C02F 101/36* (2006.01)
  *C02F 101/30* (2006.01)

(52) U.S. Cl.
  CPC .......... *C02F 1/5263* (2013.01); *C02F 1/5236* (2013.01); *C02F 1/5272* (2013.01); *C02F 2101/30* (2013.01); *C02F 2101/36* (2013.01)

(58) Field of Classification Search
  CPC .................................................... C02F 1/5263
  See application file for complete search history.

(56) References Cited

FOREIGN PATENT DOCUMENTS

| CN | 105692772 A | 6/2016 |
| CN | 111547935 A | 8/2020 |
| CN | 112456624 A | 3/2021 |

OTHER PUBLICATIONS

CNIPA, Notification of a First Office Action for CN202110527180.9, dated Feb. 11, 2022.

(Continued)

*Primary Examiner* — Peter Keyworth
(74) *Attorney, Agent, or Firm* — Zhigang Ma

(57) ABSTRACT

An enhanced coagulation method for removing microplastics in water is provided. First, a certain amount of inorganic suspended particles are added to microplastic wastewater to increase the number of particles and thereby improve a collision probability among the particles; and then a natural polymer flocculant and a polysilicic acid are added. The polysilicic acid is used as coagulant aid, so that the three materials can comprehensively achieve the purpose of removing the microplastics in the wastewater. The enhanced coagulation method can combine respective characteristics and advantages of the three materials, so that the three materials can mutually complement each other and give full play to the role of charge neutralization and bridging and net capturing, strengthen the sedimentation performance and enhance the actual microplastic removal effect. Therefore, it is a green and environmentally-friendly enhanced coagulation technology.

3 Claims, 2 Drawing Sheets

(56) References Cited

OTHER PUBLICATIONS

Nanjing University (Applicant), Reply to Notification of a First Office Action for CN202110527180.9, w/ replacement claims, dated Feb. 28, 2022.
Nanjing University (Applicant), Supplemental Reply to Notification of a First Office Action for CN202110527180.9, w/ (allowed) replacement claims, dated Mar. 22, 2022.
CNIPA, Notification to grant patent right for invention in CN202110527180.9, dated Apr. 2, 2022.

ENHANCED COAGULATION METHOD FOR REMOVING MICROPLASTICS IN WATER

CROSS-REFERENCE TO RELATED APPLICATION

This application claims a priority to a Chinese patent application No. 202110527180.9 filed to the China National Intellectual Property Administration on May 14, 2021. The entire content of the above-mentioned application is hereby incorporated by reference in its entirety.

TECHNICAL FIELD

The present disclosure relates to the field of water environment treatment, in particular to an enhanced coagulation method for removing microplastics in water.

BACKGROUND

Plastics, such as polyvinyl chloride, polypropylene, polyethylene, polystyrene and polyethylene terephthalate, are widely used in various fields and provide great convenience for our daily life. However, large-scale applications of the plastics have also brought increasingly serious plastic pollution problems, and these compounds are exposed to wind and sun in the natural environment and cannot be completely degraded, and gradually become smaller microplastics after being broken, resulting in more serious microplastic pollution and threatening the survival of marine organisms and the development of tourism, fisheries and commerce. Microplastics are a kind of pollutants, which are difficult to degrade in the natural environment and would endanger ecological health. On the other hand, the microplastics have the characteristics of small particle size, large specific surface area and strong hydrophobic ability, and are ideal attachments for many heavy metals and hydrophobic organic pollutants, resulting in the formation of composite pollutants of micro plastics with other pollutants and thereby causing greater harm. In 159 drinking water samples around the world, microplastics were detected in about 81% of the samples, which is enough to illustrate the severity of microplastic pollution and their impact on human beings. In the year 2015, the United Nations has listed the microplastic pollution as one of new environmental pollution problems, and since then, the issue of how to remove microplastics in the water environment has attracted more and more attention.

At present, typical microplastic water treatment processes include membrane filtration, biological treatment processes, coagulation and so on. Among them, shapes, sizes and masses of microplastic particles have a great impact on the removal effect of the membrane filtration, and microplastics would aggravate membrane pollution and deteriorate the removal performance. The biological treatment process, such as a bioreactor, can remove more than 99% of microplastics, but the biological treatment process has harsh treatment conditions and high cost. As a traditional water treatment process, coagulation has the characteristics of easy operation and low cost, and can effectively remove suspended colloidal particles in water, and has also been shown to be practicable for the removal of microplastics. Some researchers used a traditional aluminum salt coagulant to remove polyethylene microplastics, and the result showed that it had better effect than an iron salt coagulant, but a dosage of the aluminum salt coagulant was excessively high and the removal efficiency was only 40%. In addition, the use of aluminum salt would lead to its inevitable residue in water, and eventually cause damage to the environment and human health. Therefore, how to enhance the environmental friendliness of the coagulation process and reduce its side effects while improving the removal effect of microplastics has become the focus of research.

SUMMARY

Accordingly, the present disclosure proposes an enhanced coagulation method for removing microplastics in water, to effectively remove microplastics and reduce turbidity and meanwhile substitute inorganic salt coagulants harmful to human beings and thereby ensure the cleanness and safety of water, and is a green and environmentally-friendly enhanced coagulation technology.

In order to realize the above objective, the present disclosure provides technical solutions as follows.

Specifically, a first technical solution is that: a microplastic remover may include inorganic suspended particles, a natural polymer flocculant, and a polysilicic acid.

In a preferred embodiment, the inorganic suspended particles include one of kaolin clay, attapulgite clay, montmorillonite, and talcum powder.

In a preferred embodiment, the natural polymer flocculant (also referred to as natural polymer based flocculant) includes one of modified starch, chitosan, cellulose, modified cellulose, lignin, and lignin derivatives.

A second technical solution is that: an enhanced coagulation method for removing microplastics in water may include: adding inorganic suspended particles into water containing microplastics, stirring, and then adding a natural polymer flocculant and a polysilicic acid at the same time.

In a preferred embodiment, the polysilicic acid may be replaced by anionic polyacrylamide.

In a preferred embodiment, the microplastics include on of polyvinyl chloride, polypropylene, polyethylene, and polystyrene; and a particle size of the microplastics is in a range of 100 nanometers (nm) to 500 micrometers (μm).

In a preferred embodiment, a content of the microplastics in the water is in a range of 1.0 to 5.0 mg/L (microgram per liter).

In a preferred embodiment, a dosage of the inorganic suspended particles is in a range of 1.0 to 3.0 mg/L.

In a preferred embodiment, a dosage of the natural polymer flocculant is in a range of 0.5 to 2.0 mg/L.

In a preferred embodiment, a dosage of the polysilicic acid is in a range of 5.0 to 10.0 mg/L.

A third technical solution is that: an application in wastewater of an enhanced coagulation method for removing microplastics in water, and the wastewater is low-turbidity micro-polluted surface water, organic wastewater, acidic wastewater, or alkaline wastewater.

Natural polymers are macromolecules from animals, plants and microbial resources in nature, they can be easily decomposed into water and carbon dioxide after being discarded and are environment-friendly materials with wide sources and non-toxic, and moreover they are renewable resources completely independent on petroleum resources and therefore can be used to prepare environmentally-friendly flocculants. Polysilicic acid as one of early inorganic coagulant aids also has the environmentally-friendly and non-toxic characteristics and has a reticular three-dimensional structure as well as high molecular weight, and moreover polysilicic acid can adsorb many inorganic and organic matters in water by relying on the hydrogen bonding of surface hydroxyl groups, so that it has strong bonding ability and adsorption bridging effect. Therefore, such materials can be used as environmentally-friendly and efficient coagulants, and have the application value of substituting the traditional coagulants to remove microplastics.

In addition, enhanced coagulation is an improved process based on the traditional coagulation technology, which aims to improve coagulation efficiency and water quality. The enhanced coagulation process affects the coagulation effect. Therefore, the present disclosure proposes the following process to purify the microplastic wastewater. Firstly, a certain amount of inorganic suspended particles are added to the microplastic wastewater to increase the number of particles and thereby improve a collision probability among the particles; and then a natural polymer flocculant and a polysilicic acid are added simultaneously. The polysilicic acid is used as a coagulant aid, so that the three materials can comprehensively achieve the purpose of removing the microplastics in the water.

The enhanced coagulation technology proposed by the present disclosure can combine respective characteristics and advantages of the three materials, so that the three materials can mutually complement each other and give full play to the role of charge neutralization and bridging and net capturing, strengthen the sedimentation performance and enhance the actual microplastic removal effect. Therefore, it is a substitutable green and environmentally-friendly enhanced coagulation technology.

Compared with the related art, the present disclose may achieve beneficial effects as follows.

1. The present disclosure uses the enhanced coagulation technology to treat the microplastic wastewater, which can effectively remove most of microplastics and reduce the turbidity of water.

2. The enhanced coagulation process according to the present disclosure may have the advantages of simple operation, low cost and remarkable effect, and the process can remove a variety of pollutants at the same time without introducing other pollutants, so as to ensure the cleanness and safety of water.

3. The chemical reagents used in the present disclosure are easy to obtain and low in price, and thus the production cost is low.

4. The chemical reagents used in the present disclosure are green and environment-friendly, and the flocculant and coagulant aid are non-toxic and harmless. Compared with the traditional coagulants harmful to the environment such as the aluminum salts and the iron salts sold in the market, it is an environment-friendly and efficient water treatment agent.

BRIEF DESCRIPTION OF DRAWINGS

In order to explain technical solutions in embodiments of the present disclosure or in the related art more clearly, drawings used in the illustrative embodiments will be briefly introduced in the following. It is apparent that the drawings in the following description are only some embodiments of the present disclosure. For those skilled in the art, other drawings can be obtained according to these drawings without paying creative labor.

DETAILED DESCRIPTION OF EMBODIMENTS

Figure 1:
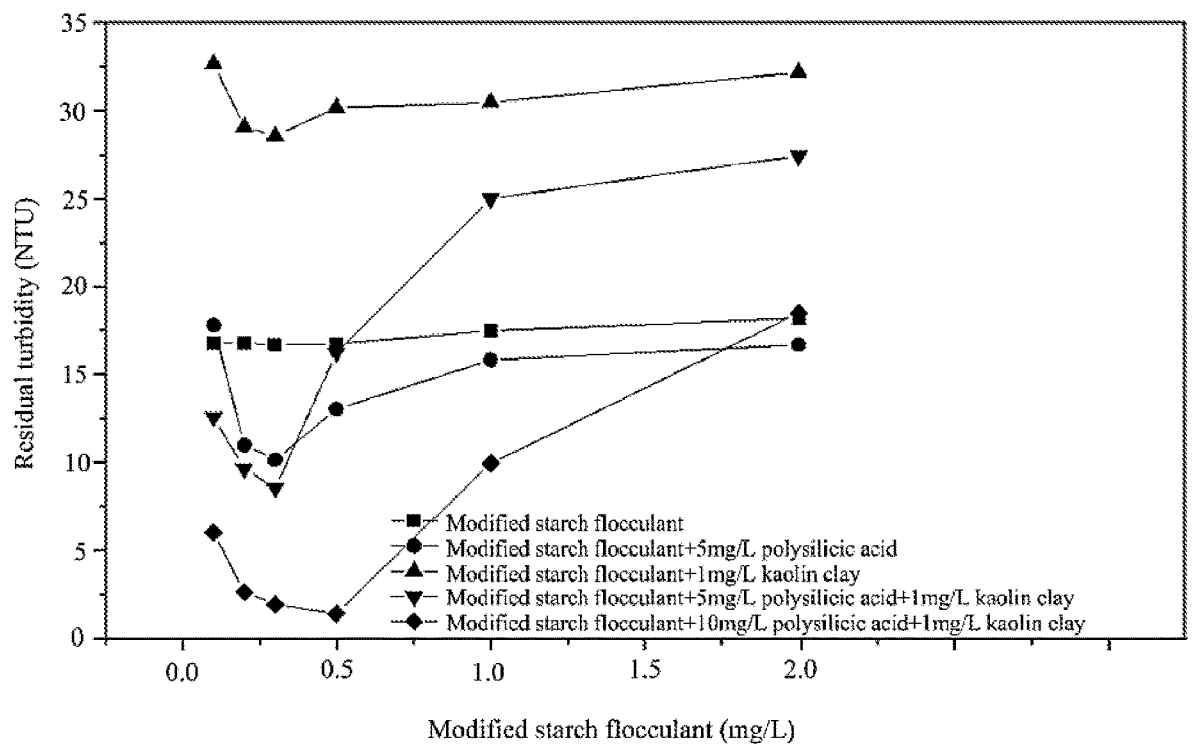
FIG. 1 illustrates a schematic diagram of effects on the removal of microplastics of dosages of a modified starch flocculant according to embodiment 1 of the present disclosure.

Various illustrative embodiments of the present disclosure will be described below in detail. The detailed description should not be considered as a limitation of the present disclosure, and should be understood as a more detailed description of some aspects, features and embodiments of the present disclosure.

It should be understood that the terms described in the present disclosure are only for describing special embodiments and are not used to limit the present disclosure. In addition, for any numerical range in the present disclosure, it should be understood as intermediate values between upper and lower limits of the range are also specifically disclosed. Any stated value or intermediate values within any stated range, and any other stated values or smaller ranges among the intermediate values within the stated range are also included in the present disclosure. Upper and lower limits of these smaller ranges can be independently included in or excluded from the range.

Unless otherwise stated, all technical and scientific terms used herein have the same meanings generally understood by those skilled in the art of the present disclosure. Although the present disclosure only describes preferred methods and materials, any methods and materials similar or equivalent to those described herein may also be used in embodiments or tests of the present disclosure. All documents mentioned in this specification are incorporated by reference to disclose and describe methods and/or materials related to the documents. In case of conflict with any incorporated document, the contents of this specification shall prevail.

It is apparent to those skilled in the art that various improvements and changes can be made to specific embodiments of the description of the present disclosure without departing from the scope or spirit of the present disclosure. Other embodiments obtained from the description of the present disclosure will be apparent to those skilled in the art. The description and embodiments of the present disclosure are only illustrative.

The terms "comprise", "include", "have", "contain" and so on used in this description are open-ended terms, that is, they mean to include but not limited to.

A raw material of polysilicic acid used in the present disclosure is self-prepared in our laboratory. In particular, weighing 10 grams (g) sodium silicate and dissolving it in 100 milliliters (mL) water; after fully dissolving, adjusting the pH to 2~6 with sulfuric acid to obtain a solution; then stirring the obtained solution at 20~40 degrees Celsius (° C.) for 0.5~2.5 h; and activating to obtain a polysilicic acid solution with a certain degree of activation.

Embodiment 1

A raw material used in this embodiment is:
a 3-chloro-2-hydroxypropyltrimethyl ammonium chloride modified starch flocculant self-prepared in our laboratory. Specifically, 3-chloro-2-hydroxypropyl trimethyl ammonium chloride was used as a cationic etherifying agent, and the modified starch flocculant was prepared by etherification under an alkaline condition. Specific steps may be as follows. 40 g starch was taken and dispersed into 200 mL water, sodium hydroxide (NaOH) then was added to adjust the pH value to 12~13, and then it was stirred and reacted at a constant temperature of 70° C. for 1 h. After the completion of starch alkalization, 70 mL of 60% aqueous solution of 3-chloro-2-hydroxypropyltrimethylammonium chloride was slowly dropwise added to the reaction system through a constant pressure separating funnel, and then continued to stirring at a constant temperature for 2 h. After the reaction is ended, the mixture was adjusted to be neutral with HCl, then was added with absolute ethanol to achieve solid-liquid separation, unreacted 3-chloro-2-hydroxypropyl trimethylammonium chloride then was washed for removal, and it was repeated for many times. The precipitate was dried in an oven at 60° C. to be a bulk in shape, and then was ground to obtain powdered modified starch flocculant.

Method is that:

adding inorganic suspended particles in water containing microplastics, stirring, and then adding a natural polymer flocculant (also referred to as natural polymer based flocculant) and a polysilicic acid simultaneously.

Simulated water samples were prepared with 500 nm polystyrene microplastics, and a concentration of each the water sample was 5.0 mg/L. Raw materials are added as per schemes shown in the below TABLE 1, and there are scheme A, scheme B (a dosage of polysilicic acid is 5 mg/L), scheme C (a dosage of kaolin clay is 1 mg/L), scheme D (a dosage of polysilicic acid is 5 mg/L, and a dosage of kaolin clay is 1 mg/L), and scheme E (a dosage of polysilicic acid is 10 mg/L, and a dosage of kaolin clay is 1 mg/L). Dosages (also referred to as adding amounts) of the modified starch flocculant in each of the schemes A, B, C, D and E are carried out as per the below TABLE 2, so as to explore the removal rate of microplastics in water with the dosage change of the modified starch flocculant of different schemes, and the results are shown in FIG. 1.

$$\text{Removal rate (\%)} = \frac{\text{initial turbidity} - \text{residual turbidity}}{\text{initial turbidity}} \times 100\%.$$

TABLE 1

| | Scheme | | | | |
|---|---|---|---|---|---|
| | A | B | C | D | E |
| Kaolin clay | − | − | + | + | + |
| Modified starch flocculant | + | + | + | + | + |
| Polysilicic acid | − | + | − | + | + |

TABLE 2

| | Dosage/(mg/L) | | | | | |
|---|---|---|---|---|---|---|
| Modified starch flocculant | 0.1 | 0.2 | 0.3 | 0.5 | 1.0 | 2.0 |

As seen from FIG. 1, it can be found that when the dosage of the kaolin clay is 1.0 mg/L, the dosage of the modified starch flocculant is 0.5 mg/L and the dosage of the polysilicic acid is 10.0 mg/L, the residual turbidity is 1.42 NTU (nephelometric turbidity unit) and the removal rate of microplastics is 92%. Compared with other coagulation processes such as using the modified starch flocculant alone or without using the kaolin clay, the removal effect of microplastics is significantly improved, and thus achieving an efficient enhanced coagulation removal technology. The enhanced coagulation technology increases the number of particles by adding the kaolin clay to increase the collision probability among the particles, and thereby improves floc characteristics as well as the sedimentation performance. Moreover, the modified starch flocculant is added to compress the electric double-layer of the kaolin clay and the microplastics to destabilize them in water, assisted by the high-efficiency bridging and net capturing effect of the polysilicic acid, the synergistic effect of the three materials can effectively remove microplastics in water.

Another simulated water sample was prepared with 500 nm polystyrene microplastics, and a concentration of the water sample was 5.0 mg/L. Dosages of the polysilicic acid are carried out as per the below TABLE 3, so as to explore the removal rate of microplastics in water with the dosage change of the polysilicic acid while the dosages of the modified starch flocculant and the kaolin clay are fixed at 0.5 mg/L and 1.0 mg/L respectively, and the results are shown in FIG. 2.

TABLE 3

| | Dosage/(mg/L) | | | | | |
|---|---|---|---|---|---|---|
| Polysilicic acid | 0 | 2 | 4 | 5 | 6 | 8 | 10 |

Figure 2:
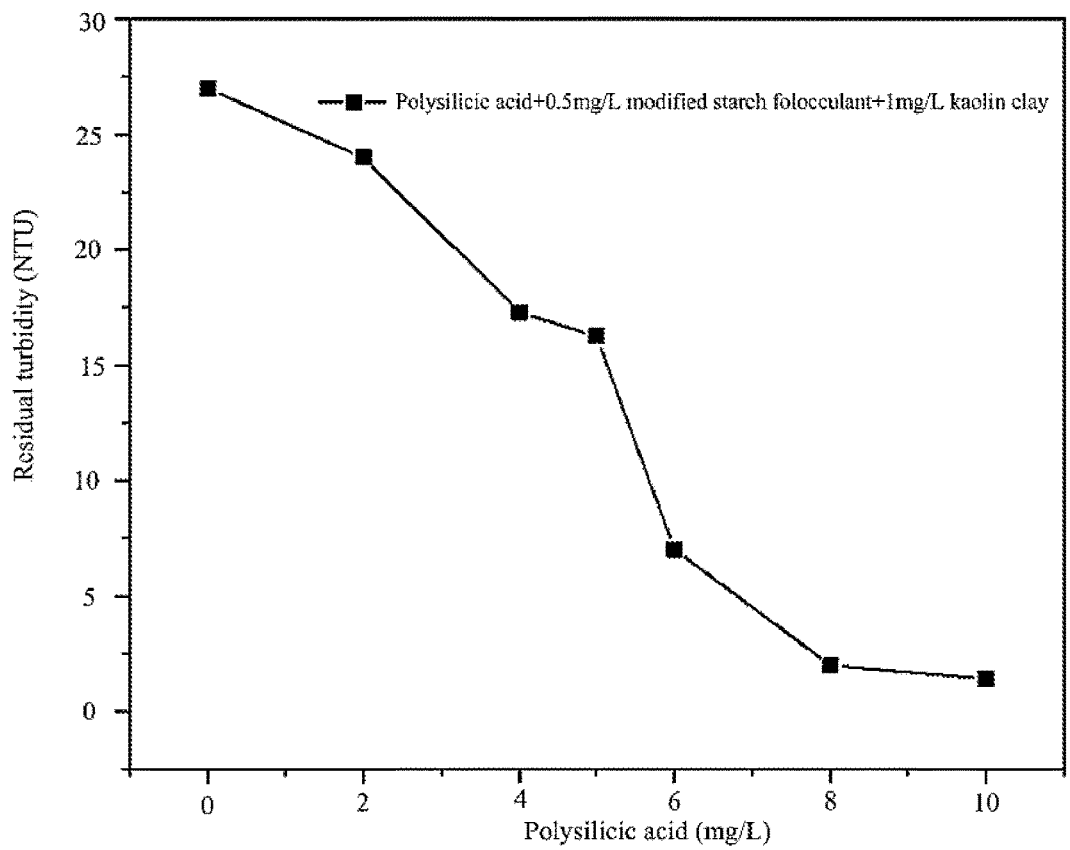
FIG. 2 illustrates a schematic diagram of effects on the removal of microplastics of dosages of a polysilicic acid according to the embodiment 1 of the present disclosure.

As seen from FIG. 2, it can be found that the dosage of the polysilicic acid is directly proportional to the removal rate of microplastics, but when the dosage is up to 8~10 mg/L, the removal rate does not change much, indicating that the dosage of polysilicic acid is not the more the better.

Still another simulated water sample was prepared with 500 nm polystyrene microplastics, and a concentration of the water sample was 5.0 mg/L. Dosages of the kaolin clay are carried out as per the below TABLE 4, so as to explore the removal rate of microplastics in water with the dosage change of the kaolin clay while the dosages of the modified starch flocculant and the polysilicic acid are fixed at 0.5 mg/L and 10 mg/L respectively, and the result is shown in FIG. 3.

TABLE 4

| | Dosage/(mg/L) | | | | | |
|---|---|---|---|---|---|---|
| Kaolin clay | 0 | 1 | 2 | 3 | 4 | 5 | 6 |

Figure 3:
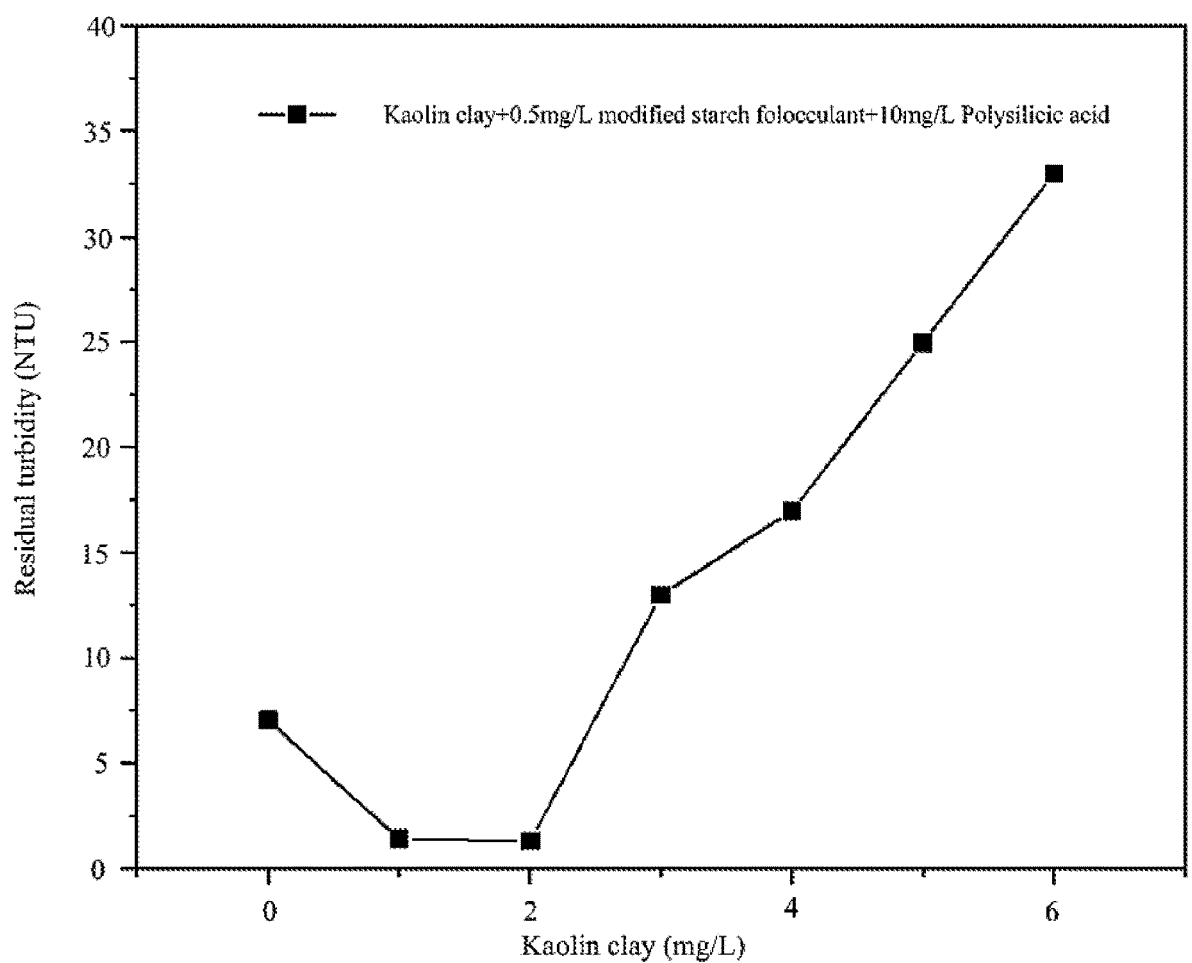
FIG. 3 illustrates a schematic diagram of effects on the removal of microplastics of dosages of a kaolin clay according to the embodiment 1 of the present disclosure.

As seen from FIG. 3, it can be found that when the dosage of kaolin clay is 1~2 mg/L, the removal rate of microplastics is the highest, and when it is reduced or added more, the removal rate of microplastics decreases significantly.

Embodiment 2

A raw material used in this embodiment is:

chitosan, which is commercially available.

A simulated water sample was prepared with 100 nm polyethylene microplastics, and a concentration of the water sample was 5.0 mg/L. Attapulgite clay was added with a dosage of 3.0 mg/L, stirred to make them mixed evenly, and then added with the chitosan and a polysilicic acid. Dosages of the chitosan and the polysilicic acid are 2.0 mg/L and 5.0 mg/L respectively. As a result, a removal rate of microplastics is 91%.

Embodiment 3

A raw material used in this embodiment is:

a modified cellulose flocculant self-prepared in our laboratory. In particular, 4 g cellulose was weighed and added into a mixed solution of ethanol and NaOH, and was alkalized at 80° C. for 1 h. 1 g chloroacetic acid was dissolved and then added into the solution dropwise, and continued to reacting for 1.5 h. The obtained product was filtered, moistened with 75% ethanol solution and dried in vacuum at 60° C., and the resultant product is carboxymethyl cellulose. 1 g carboxymethyl cellulose was taken and put into a 250 mL four necked bottle, and 100 mL distilled water then was added. After the carboxymethyl cellulose solution become uniform, nitrogen was introduced into the system for 25 min. Afterwards, a certain amount of aqueous solution of initiator of ammonium persulfate was added, and nitrogen was continued to be introduced for 5 min to make the initiator sufficiently initiate. Then, $N_2$ was kept to continuously flow into the system, a certain amount of methacryloyloxyethyl trimethylammonium chloride aqueous solution is slowly dropwise added through a constant pressure dropping funnel, and reacted at 55° C. for 3 h (h). After the reaction is ended, acetone was used as precipitant to precipitate and separate the product. The obtained solid product was fully embrittled in absolute ethanol, filtered and washed, and then transferred to a Soxhlet extractor to extract with acetone as extraction solution for 48 h. The resultant product was dried to a constant weight under the condition of 60° C. in a vacuum oven to obtain the modified cellulose flocculant.

A simulated water sample was prepared with 500 μm polyethylene microplastics, and a concentration of the water sample was 5.0 mg/L. Montmorillonite was added with a dosage of 3.0 mg/L, stirred to make them mixed evenly, and then added with the modified cellulose flocculant and a polysilicic acid. Dosages of the modified cellulose flocculant and the polysilicic acid are 1.0 mg/L and 10.0 mg/L respectively. As a result, a removal rate of microplastics is 90%.

Embodiment 4

A raw material used in this embodiment is:
a modified lignin flocculant self-prepared in our laboratory. In particular, 10 g dealkylated lignin was added into 30 mL distilled water, and the pH value then was adjusted to about 10 through 0.1 mol/L NaOH aqueous solution. The lignin solution then was put into a three necked flask, stirred in a 333 K water bath for 1 h, and then was added with 2 g epichlorohydrin dropwise. After the dropwise adding, it is continued to react at 333 K for 6 h. After the reaction is ended, it was washed with dilute alkali, dilute acid and distilled water sequentially for many times, and finally put into a vacuum drying oven and dried at 333 K for 24 h. After being crushed by a high-speed stirring pulverizer, the modified lignin flocculant was obtained.

A simulated water sample was prepared with 100 μm polypropylene microplastics, and a concentration of the water sample was 1.0 mg/L. Talcum powder was added with a dosage of 2.0 mg/L, stirred to make them mixed evenly, and then added with the modified lignin flocculant and a polysilicic acid. Dosages of the modified lignin flocculant and the polysilicic acid are 1.5 mg/L and 5.0 mg/L respectively. As a result, a removal rate of microplastics is 91%.

Embodiment 5

Similar to the above Embodiment 2, and a difference is that: the concentration of water sample is 3.0 mg/L. As a result, a removal rate of microplastics is 92%. A reason is that the concentration of water sample refers to a concentration of microplastic particles in the water, the greater the concentration, the more microplastic particles, the higher the collision efficiency, and the higher the removal rate. In the coagulation mechanism, it is called as crowding sedimentation.

Embodiment 6

Similar to the above Embodiment 2, and a difference is that: the dosage of the polysilicic acid is 7 mg/L. As a result, a removal rate of microplastics is 91.5%. A reason is that the higher the concentration of polysilicic acid, the more significant the bonding and bridging effect, and correspondingly the higher the removal rate.

Embodiment 7

Similar to the above Embodiment 2, and a difference is that: the polysilicic acid is replaced by anionic polyacrylamide. As a result, a removal rate of microplastics is 90%.

Embodiment 8

Similar to the above Embodiment 2, and a difference is that: the microplastic wastewater is replaced by low-turbidity micro-polluted surface water. As a result, a removal rate of turbidity is 91.5%, and a removal rate of $UV_{254}$ (indexing organic matter in water) is 68%.

Embodiment 9

Similar to the above Embodiment 2, and a difference is that: the microplastic wastewater is replaced by organic wastewater containing humic acid. As a result, a removal rate of the humic acid is 80%.

Comparative Example 1

Similar to the above embodiment 2, and a difference is that: the concentration of water sample is 10.0 mg/L. As a result, a removal rate of microplastics is 85%.

The above description is only preferred embodiments of the present disclosure and is not intended to limit the present disclosure. Any modification, equivalent substitution and improvement made within the spirit and principles of the present disclosure shall be included in the protection scope of the present disclosure.

What is claimed is:
1. An enhanced coagulation method for removing microplastics in water, using a microplastic remover;
wherein the microplastic remover comprises: inorganic suspended particles, a natural polymer based flocculant, and a polysilicic acid;
wherein the inorganic suspended particles comprise one selected from the group consisting of kaolin clay, attapulgite clay, montmorillonite, and talcum powder;
wherein the natural polymer based flocculant comprises one selected from the group consisting of modified starch, chitosan, cellulose, modified cellulose, lignin, and lignin derivatives;
wherein the enhanced coagulation method comprises: adding the inorganic suspended particles into water containing microplastics, stirring, and then adding the natural polymer based flocculant and the polysilicic acid simultaneously;
wherein a content of the microplastics is in a range of 1.0 to 5.0 micrograms per liter (mg/L);

wherein a dosage of the inorganic suspended particles is in a range of 1.0 to 3.0 mg/L;
wherein a dosage of the natural polymer based flocculant is in a range of 0.5 to 2.0 mg/L; and
wherein a dosage of the polysilicic acid is in a range of 5.0 to 10.0 mg/L.

2. The enhanced coagulation method according to claim 1, wherein the microplastics comprise one selected from the group consisting of polyvinyl chloride, polypropylene, polyethylene, and polystyrene; and a particle size of the microplastics is in a range of 100 nanometers to 500 micrometers.

3. An application method of the enhanced coagulation method according to claim 1, wherein the enhanced coagulation method is applied to remove microplastics in wastewater, and the wastewater is one selected from one of micro-polluted surface water, organic wastewater, acidic wastewater, and alkaline wastewater.

* * * * *